United States Patent
Logatoc

(10) Patent No.: US 8,831,920 B2
(45) Date of Patent: Sep. 9, 2014

(54) AUTOMATED CABLING LAYOUT SYSTEMS AND METHODS

(75) Inventor: Michael I. Logatoc, Calgary (CA)

(73) Assignee: Fluor Technologies Corporation, Aliso Viejo, CA (US)

( * ) Notice: Subject to any disclaimer, the term of this patent is extended or adjusted under 35 U.S.C. 154(b) by 265 days.

(21) Appl. No.: 13/314,064

(22) Filed: Dec. 7, 2011

(65) Prior Publication Data

US 2012/0158370 A1    Jun. 21, 2012

Related U.S. Application Data

(60) Provisional application No. 61/423,199, filed on Dec. 15, 2010.

(51) Int. Cl.
*G06G 7/48* (2006.01)

(52) U.S. Cl.
USPC .................................................. 703/6

(58) Field of Classification Search
USPC .................................................. 703/6
See application file for complete search history.

(56) References Cited

U.S. PATENT DOCUMENTS

| | | | |
|---|---|---|---|
| 5,021,968 | A | 6/1991 | Ferketic |
| 5,692,184 | A | 11/1997 | Ardoin et al. |
| 5,740,341 | A | 4/1998 | Oota et al. |
| 6,205,397 | B1 | 3/2001 | Eslambolchi et al. |
| 6,633,869 | B1 | 10/2003 | Duparcmeur et al. |
| 7,013,247 | B2 | 3/2006 | Fujioka |
| 7,188,072 | B2 | 3/2007 | Eichstaedt et al. |
| 7,444,269 | B2 | 10/2008 | Drumheller |
| 2006/0247902 | A1 | 11/2006 | Rourke |
| 2007/0038415 | A1 | 2/2007 | Okada et al. |
| 2008/0120070 | A1 | 5/2008 | Miller et al. |
| 2008/0172722 | A1* | 7/2008 | Fujita et al. ............... 726/4 |
| 2009/0248609 | A1 | 10/2009 | Kawai et al. |
| 2009/0282067 | A1 | 11/2009 | Bendigeri et al. |
| 2009/0292514 | A1 | 11/2009 | McKim et al. |
| 2009/0300083 | A1 | 12/2009 | Herold et al. |
| 2010/0181438 | A1 | 7/2010 | Chauzu et al. |

FOREIGN PATENT DOCUMENTS

| | | |
|---|---|---|
| EP | 0621545 | 10/1994 |
| EP | 2178013 | 4/2010 |
| EP | 2228740 | 9/2010 |
| WO | 90/03618 | 4/1990 |
| WO | 2009/158466 | 12/2009 |

OTHER PUBLICATIONS

Zhizhang et al.; Computer-Aided Engineering for CANDU Projects; China Journal of Nuclear Power Engineering, Oct. 1999 vol. 20 No. 6; 17 pages.*

(Continued)

*Primary Examiner* — Hugh Jones
(74) *Attorney, Agent, or Firm* — Fish & Tsang, LLP

(57) ABSTRACT

Automated cabling layout systems and methods are presented. A cabling assembly library stores multiple generic, design-tool agnostic cabling assembly objects representing cabling layout objects (e.g., cables, trays, mounts, conduits, etc.). The cabling assembly objects further include design rules governing the conditions of use of the cabling assembly object. Design engineers or designers can query the library to identify appropriate cabling assembly objects that would be appropriate for using within a modeled physical environment. One or more matching cabling assembly objects can be converted to an appropriate format for a design tool and instantiated into the modeled environment. The design tool can create modeled cabling layouts from the instantiated assemblies according to the design rules of the corresponding cabling assembly objects.

29 Claims, 6 Drawing Sheets

(56) References Cited

OTHER PUBLICATIONS

Park et al.: An agent-based approach to concurrent cable harness design; AI EDAM, vol. 8, No. 01. (1994); 33 pages.*
Suh et al.; Integrated CAD System for Ship and Offshore Projects; International Journal of CAD/CAM; vol. 6, No. 1 (2006); pp. 1-12.*
Sriprasert et al.: 'Multi-constraint information management and visualisation for collaborative planning and control in construction', Electronic Journal of Information Technology in Construction, 8; 2003; pp. 341-366.*
Patent Cooperation Treaty, "Notification of Transmittal of the International Search Report and the Written Opinion of the International Searching Authority, or the Declaration", PCT Application No. PCT/US12/68171, issued Mar. 4, 2013, 13 pages.
Van Der Velden, C. et al., "An intelligent system for automatic layout routing in aerospace design", Innovations Systems Software Engineering, 2007, vol. 3, pp. 117-128.

* cited by examiner

Modeled Physical
Environment 600

US 8,831,920 B2

AUTOMATED CABLING LAYOUT SYSTEMS AND METHODS

This application claims the benefit of priority to U.S. patent application Ser. No. 61/423,199 filed on Dec. 15, 2010, which is incorporated by reference in its entirety.

FIELD OF THE INVENTION

The field of the invention is computer aided design technologies, specifically, systems and methods for planning cabling layouts.

BACKGROUND

When designing a construction project, design engineers are required to plan a layout for installing various cables, such as power lines and communication lines (e.g., Ethernet cable, fiber optics cable, telephone cable, etc). Planning a cabling layout can be a very complex and difficult task, especially for large construction projects. The design engineer's responsibilities include: defining cable routes, selecting and/or designing hardware (e.g., trays, fasteners, electrical panels), determining the number of lanes per route, and assigning cables to lanes, among many other things. The design engineer's principle objective is to plan a cabling layout that is cost effective and yet complies with customer specifications, industry standards, and government regulations.

As used herein, the term "cabling layout" refers to an overall plan for installing cables and related hardware into a building or structure. A cabling layout preferably identifies cable routes between electrical & control systems devices (e.g., equipments, motors, panels, etc.) and defines the necessary parameters for properly installing the cables. Examples of parameters include, but are not limited to: number of cables, size of cables, name of cables, voltage and amperage limits of cables, number of routing trays, size of routing trays, tray lanes per route, assignment of cables to lanes and routes, space between parallel tray lanes, fill capacity of trays, number of fasteners, and fastener types. A well-designed cabling layout will take into account customer specifications (e.g., power usage requirements, redundancy requirements, material quality requirements, etc) as well all industry and government safety standards.

Current planning processes for planning cabling layouts are time consuming. The design engineer usually begins by modeling the structure in a 3-dimensional electronic environment using a computer aided design (CAD) tool, and then determining cable routes (e.g., pathways) within the 3D environment. The design engineer or designer then manually imports cable tray models into the 3D environment along the established routes. Finally, the design engineer manually assigns each cable to a tray according to specifications, rules, and industry standards. At this point, the engineer will often encounter conflicts and rule violations, due to the interdependency of many different parameters and constraints. For example, a tray could be filled with cables beyond an acceptable fill limit. The engineer must then iteratively go through the process, changing routes, tray sizes, and other parameters, until a satisfactory cabling layout has been achieved.

In addition to being time consuming, current methods and systems for planning cabling layouts fail to account for the constantly changing nature of large construction projects. Unfortunately, a design change in one area the construction project can affect the cabling layout in a distant area of the project. For example, a design change to a network operation center will affect cable routes running from the operation center to remote offices. Therefore, a design engineer must track changes from a global perspective with a fine granular view. Ideally, processes and systems for construction projects should automatically track changes occurring to properties in a modeled environment and automatically update cabling layouts in response to the changes. Further, design processes and systems should learn from past experiences, both failures and successes, to provide improved recommendations for future projects.

Some effort has been directed toward alleviating these issues but such efforts still fall short. For example, U.S. patent application publication 2007/0038415 to Okada et al. titled "Cable Quantity Totalizing Device, Cable Quantity Totalizing Method and Cable Quantity Totalizing Program", filed Aug. 14, 2006, describes systems and methods for determining optimum cable routes in a 3D environment. Specifically, Okada seeks to improve efficiency by minimizing the amount of data needed to determine an optimum cable route. Japanese patent abstract JP 2001177934 to Sakai et al. titled "Cable Tray Allocating Device", filed Dec. 16, 1999, describes a computer system for allocating cable trays to a cable tray path. Although less relevant, U.S. Pat. No. 5,740,341 to Oota et al. titled "Design and Production Supporting System for Component Arrangement and Pipe Routing", filed Apr. 4, 1994, discusses that pipes or cable trays can be routed based on end points. The above references require a cable route to be established before determining how a cabling layout should be established.

Some design tools alleviate the efforts by employing automated routing algorithms. However, such algorithms fail to take into account past experiences of laying out cable runs. For example, U.S. Pat. No. 5,021,968 to Ferketic titled "Graphics-Based Wire-Cable Management System" filed Nov. 20, 1989, discusses automatically routing cables between two locations in a structure. In a similar vein Japanese patent abstract JP09167173 assigned to Hitachi Plant Engineering & Construction Co Ltd. titled "Method for Designing Installation of Cable Tray", filed Dec. 15, 1995, also describes using end-points to determine how to layout cable trays. U.S. patent application publication to Kawai et al. titled "Optimum Route Searching Apparatus, Method and Program", filed Feb. 20, 2009, discloses methods for optimizing a cable route based on various criteria. International patent application publication WO2009158466 to Miller describes a computer program that can calculate collision-free paths of pipes in a CAD system, based on the size and dimensions of pipes. Japanese patent JP2006195544 to Hirata also describes systems and methods for designing cabling layouts.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Although the above set of references advance cabling routing technologies to some degree, they also fail to address the need for incorporating previous experiences into automated cabling layout design processes. Moreover, the above references fail to provide a recommendation engine for providing recommendations on tray sizes (either standard or custom sizes), number of lanes per route, and cable assignment to lanes.

What has yet to be appreciated is automated cabling layout requirements exceed beyond merely determining a route or inserting known cable trays for the routes. Automated cabling layout design tools should manage all aspects of cabling layout including routing, modeling, assigning trays, sizing trays, and taking into account industry practices. It would be advantageous to provide a design tool that can recommend and automatically construct a model of a cabling layout within a 3D environment based on preselected end points and cable attributes. It would also be advantageous to provide a design tool that tracks changes to the 3D environment and automatically adjusts the cabling layout accordingly.

Thus, there is still a need for cabling layout systems and methods.

SUMMARY OF THE INVENTION

The inventive subject matter provides apparatus, systems and methods for automating the designing of a cabling layout within a modeled physical environment. One aspect of the inventive subject matter includes providing an assembly library (e.g., electronic storage medium) that stores parameters relevant to designing a cabling layout. For example, the library could store assembly objects (e.g., electronic data) that represent cable attributes, tray attributes, modeled physical environment properties, and assembly rules. The method further comprises selecting assembly criteria and constructing a query of the assembly library that will identify, or help to identify, one or more assembly objects that satisfy the assembly criteria. A modeled physical environment can then be automatically updated with the identified assembly objects, thus providing a cabling layout within the environment.

In some preferred embodiments, cable attributes include name, type, size, voltage capacity, and amperage capacity. Tray attributes could similarly include type, shape, size, dimension, and fastener type for cable trays.

In other aspects of some preferred embodiments, the modeled physical environment properties describe structural components of a building (e.g., trusses, beams, columns, walls).

In yet other aspects, the assembly rules are defined by customer specifications, government safety requirements, industry standards, and cable manufacturer specifications. Assembly rules could also define specific cabling routing algorithms.

In one aspect of some preferred embodiments, the method includes the step of modeling a physical environment in one or more design tools, preferably in 3D design tools (e.g., SP3D™, OptimEyes™, etc.). The design tool can additionally be configured to (i) allow a user to construct a query, (ii) query the assembly library to identify assembly objects that satisfy a selection criteria, and (iii) update the modeled physical environment with a cabling layout based on the query results. Once updated, the modeled physical environment can be presented to a user. In addition, the design tool preferably detects/tracks changes and reevaluates the cabling layout.

In some aspects of preferred embodiments, updating a modeled physical environment with a cabling layout means (i) establishing cable routes within the environment, (ii) selecting and/or designing cable trays, and (iii) updating the environment to include cable trays along the routes. Establishing cable routes and designing cable trays are preferably performed simultaneously, each one as a function of the other.

In other aspects, the step of updating a modeled physical environment with a cabling layout means (i) establishing cable routes within the environment, (ii) determining a number of lanes per route, and (iii) assigning cables to each lane.

From a systems perspective, the inventive subject matter provides a cabling layout recommendation engine that recommends cable routes and cable trays for designing a cabling layout in a modeled physical environment. The engine includes an assembly library that stores data relating to cabling layouts (e.g., cable attributes, tray attributes, modeled physical environment properties, and assembly rules). In addition, the engine includes a processor communicatively coupled with the assembly library and executable code (e.g., software program). The executable code is configured to provide cabling layout recommendations once a user has provided a modeled physical environment, a source location, a destination location, at least one cable attribute, and at least one assembly rule. Contemplated recommendations include cable routes that connect source location and destination location, a number of lanes per route, tray sizes, and cable-to-tray assignments.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server-based cabling layout systems, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including automating the cabling layout design process using a design tool. The design tool advantageously relies on industry practices, customer specifications, and user selection criteria.

Figure 1:
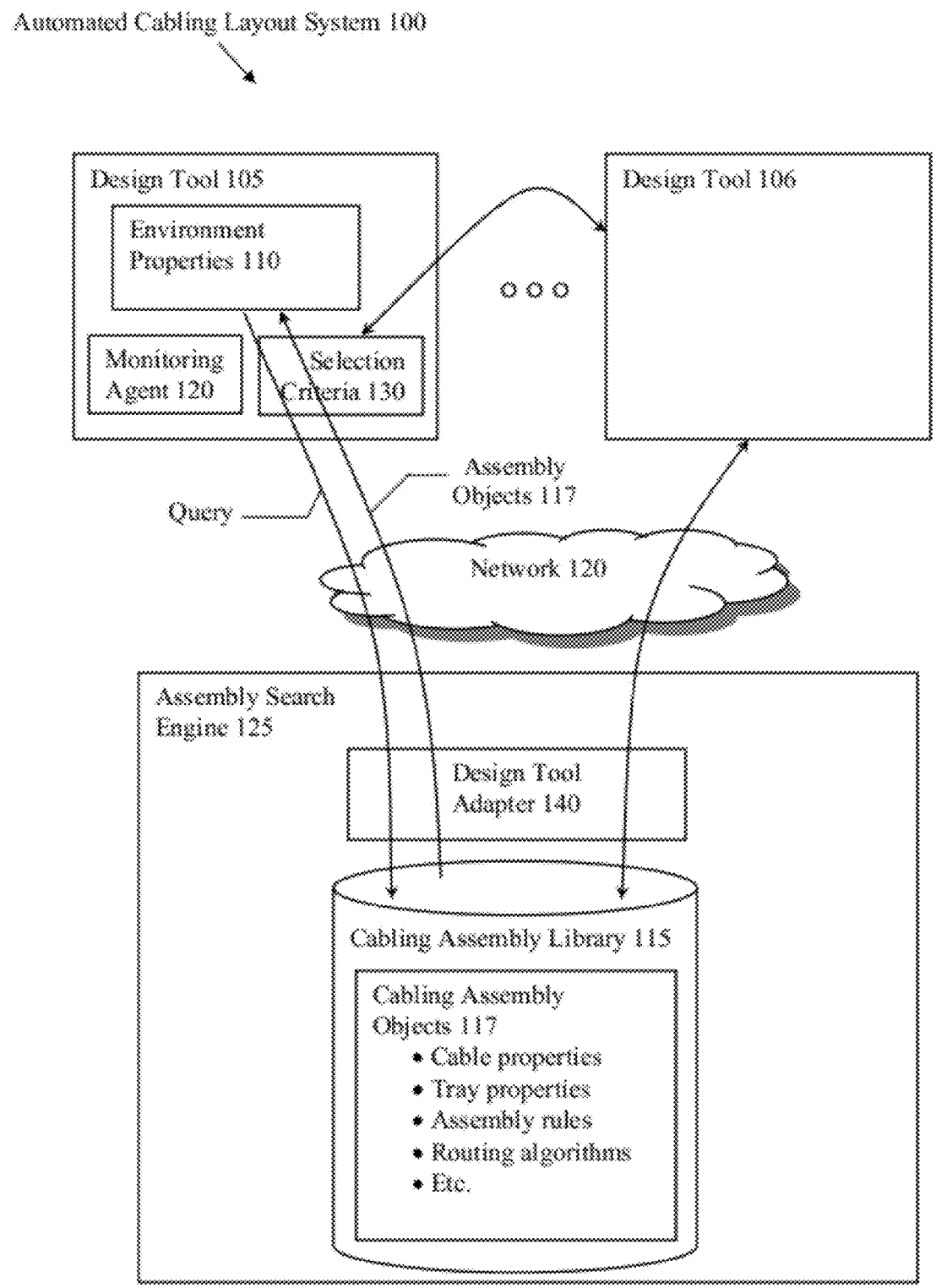
FIG. 1 is a schematic of one embodiment of a method and systems for designing a cabling layout.

FIG. 1 presents an overview of an automated cabling layout system 100. A design engineer can model a physical environment representing a possible construction project using design tool 105 and/or design tool 106. One should note that each design tool can be distinct from each other and can even be from different vendors where the design tools lack an a priori ability to communicate with each other. The modeled physical environment preferably represents a 3D model of the project and includes one or more environment properties 110.

Environment properties 110 can include descriptive metadata describing the modeled environment at various levels of detail. For example, properties 110 could include project level information, site level information, component level information, or even finer levels of granularity. Specifically contemplated environment properties can include component descriptions (e.g., dimensions of columns, trusses, beams), type of construction (e.g., medical, power generation, office building, etc.), jurisdiction information (e.g., city, county, state, province, country, etc.), geometric parameters, materials, clients, cabling end-points, or other information that describes the modeled physical environment or the project. Preferably, environment properties 110 include a source and destination locations for cable routes.

System 100 also includes a cabling assembly library 115 representing a database storing a plurality of cabling assembly objects 117, each of which represents a cabling layout parameter that can be used to plan a cabling layout within a modeled physical environment. Those of skill in the art will appreciate that library 115 could alternatively comprise a distributed database system having multiple storage medium devices connected over a wide area connection or local area connection.

Assembly objects 117 represent various parameters relevant to designing a cabling layout, for example, cables, trays, supports, anchors, conduits, junctions, mounts, routing algorithms, rules for aggregating cabling bundles, specifications, or other aspects of a cabling object. Assembly objects describe cabling objects in various levels of detail and can include information relating to how a corresponding cabling object can be used or under which circumstances the cabling object should be used. One should appreciate that assembly objects are more than merely a model of a physical object. Assembly objects could also include properties or rules. For example, an assembly object could represent industry design practices dictating how a cabling object should be incorporated into a modeled environment. Assembly objects could also represent safety rules mandated by a government or specification requirements provided by a customer. In some preferred embodiments, some of the assembly objects represent rules that are based on design practices established through previous experiences.

One should appreciate that assembly objects can also be design tool agnostic. For example, objects 117 can be stored in a neutral format that is compatible with both design tool 105 and design tool 106, even though tools 105 and 106 use different proprietary formats.

Assembly objects 117 are generic objects having rules governing their use according to a context defined by environment properties 110. When incorporated into a modeled physical environment, the generic objects are considered to be instantiated as a cabling layout within the environment. The design rules can remain present with the design to determine if changes to the modeled physical environment would violate the conditions of the design rule. In some embodiments, a monitoring agent 120 can determine if a modeled cabling layout would violate the layout's corresponding design rules.

Assembly library 115 can be accessed by design tools 105 and 106 or by design engineer over a network 120 via assembly search engine 125. When desired, the design engineer can submit a query to search engine 125 to obtain one or more assembly objects 117. The query can be constructed from the environment properties 110 where a query includes assembly selection criteria 130. Search engine 125 can identify one or more assembly objects 117 having properties that satisfy selection criteria 130 of the query. One should note an exact match is not required. For example, when multiple assembly objects 117 represent a near match, perhaps lacking one or more properties considered to satisfy selection criteria 130, search engine 125 can return a result set comprising the near matches. The results set can be ranked as desired. The design engineer can then determine which, if any, near matches can be incorporated into the modeled physical environment.

Cabling assembly objects 117 can comprise one or more assembly rules dictating conditions of use for the assembly objects 117. In some embodiments, the assembly rules are passed through a design tool adapter 140 to convert the rules into a format that can be interpreted or used by design tools 105 and 106. When design tools 105 and 106 have access to appropriate assembly objects 117, the modeled physical environment can be updated, preferably automatically, according to the assembly rules. Design tools 105 and 106 can instantiate a modeled cabling layout by integrating cabling assembly objects 117 (e.g., routes, cables, trays, mounts, etc.) into the modeled environment. Design tools 105 and 106 can also be configured to offer a design engineer an opportunity to select or otherwise modify a cabling assembly layout within the modeled physical environment.

In some embodiments, the design engineer can create new cabling assembly objects 117. Design tools 105 and 106 can be used to manually design a cabling assembly layout and then store the layout to the cabling assembly library 115. Adapter 140 and/or library 115 can convert the cabling layout from a design tool format to an acceptable generic format for storage. In addition, library 115 can tag the newly created cabling assembly objects 117 with properties 110 to indicate a context in which the newly created assembly layout was used. Newly created assembly objects 117 can be created from scratch, from existing assembly objects, or from combining assembly objects together. Thus, cabling assembly library 115 grows over time by incorporating established, well understood, verified design practices according to an actual context. In other words, system 100 provides a means for folding past experiences back into the system. In preferred embodiments, implemented cabling layouts and/or aspects of cabling layouts are assigned a grade that represents effectiveness. The grade can then be stored as an assembly object in library 115 for designing future cabling layouts.

In other embodiments, the search engine 125 is configured to automatically create new cabling assembly objects 117 when there are no objects that satisfy selection criteria 130. For example, search engine 125 could be configured to design a new cable tray size to meet the specific requirements of the selection criteria 130.

During the design phase of a construction project, changes to the modeled physical environment certainly occur. If a change affects one or more cabling layouts, system 100 can identify an exception (e.g., conflict) within the updated environment. For example, design tools 105 and/or 106 can be configured with a monitoring agent 120 that observes changes to environment properties 110. If a change violates a design rule of a modeled cabling layout, an exception can be raised where the exception reflects a conflict between the updated environment properties 110 and the assembly rules of the corresponding cabling assembly layout. Monitoring agent 120 could alternatively be located within library 115, search engine 125, distributed among members of system 100, or other locations as desired.

Monitoring agent 120 is configured to have a "global perspective," meaning that it not only monitors how changes in one geographic area can affect another area, but also how changes to one construction aspect (e.g., plumbing, room sizes, truss locations) affect other construction aspects (e.g., cabling layouts).

If an exception is raised, library 115 can generate one or more recommendations on how to proceed. In some embodiments, the exception can be used to generate an additional query that can be submitted to library 115. Library 115 can respond with an updated result comprising a subset of cabling assembly objects 117 that could either resolve the exception or could be used as a foundation for resolving the exception. A recommendation could simply include a second, different cabling assembly object which is possibly a member of the originally returned result set. The design engineer can make adjustments to the cabling assembly object or the cabling layout if necessary to bring the exception under control. Additionally, design tools 105 and/or 106, possibly via an agent, can automatically update the modeled physical environment (e.g., environment properties 110) or the cabling layout according to the assembly rules without intervention by the design engineer.

Establishing a stable cabling layout can take multiple iterations through the design phase. As discussed previously, system 100 can detect a change in the modeled physical environment other than a change to the modeled cabling layout. If the change impacts the modeled cabling layout, the selection criteria 130 can be updated based on the changes. An updated query can then be used to identify additional matching cabling assembly objects 117. The process can be repeated automatically until a stable design for a cabling layout is achieved. All updates are automatically recorded and saved in library 115.

A stable modeled cabling layout is considered to be achieved when on one or more stability conditions are satisfied. One condition could include simply detecting when an iteration counter exceeds a threshold. Another condition could include running iterations until the cabling assembly library 115 no longer offers recommendations. Numerous possible stability conditions can be used consistently with the inventive subject matter disclosed herein.

As discussed previously, cabling assembly objects 117 can include cabling routing algorithms. The routing algorithms could be embodied as a cabling assembly or embodied as assembly rules for a specific cabling object. One or more routing algorithms could be selected based on environment properties 110. For example, a cabling assembly object 117 might reflect jurisdictional requirements for Ethernet cabling. Cabling assembly object 117 can include multiple routing algorithms for the various types of Ethernet cabling (e.g., copper, optic fiber, etc.). One algorithm could be selected over another based on the properties of the modeled physical environment. If long uninterrupted cables are required, optic fiber routing algorithms might be selected over copper-based routing.

Selection criteria 130 can include source points and destination points (i.e., end points) for cable routes. For example, selection criteria 130 could represent the selection of environment properties 110 that represent electrical panel locations within the modeled physical environment. Selection criteria 130 could also include selecting which assembly rules and routing algorithms should be used in the present project, and what limits/values for the rules (e.g., maximum % to limit a tray's fill capacity, minimum safety distance to between tray lanes, etc.). In other embodiments, selection criteria 130 could include a user's preferences as to whether redundancy is required (i.e., whether multiple routes for the same application is required). Furthermore, selection criteria 130 could include prioritizing (e.g., weighing) the importance of each criterion.

In other embodiments, selection criteria 130 includes a selection of assembly objects 117 that represent assembly rules. The design engineer can define criteria 130 such that certain rules of assembly must be followed for the present cabling layout design. For example, the design engineer could define selection criteria 130 to include a rule that cable trays be filled to no more than 80% full capacity. Search engine 125 would then construct a query that returns only those assembly objects 117 that will provide a solution, or a nearest solution, to the selection criteria 130. Another example of an assembly rule could include limiting the location of where a cabling route can be located (e.g., "at least 1 foot away from the ceiling," "at least 25 feet away from a furnace location," or "must pass through service location x").

Figure 2:
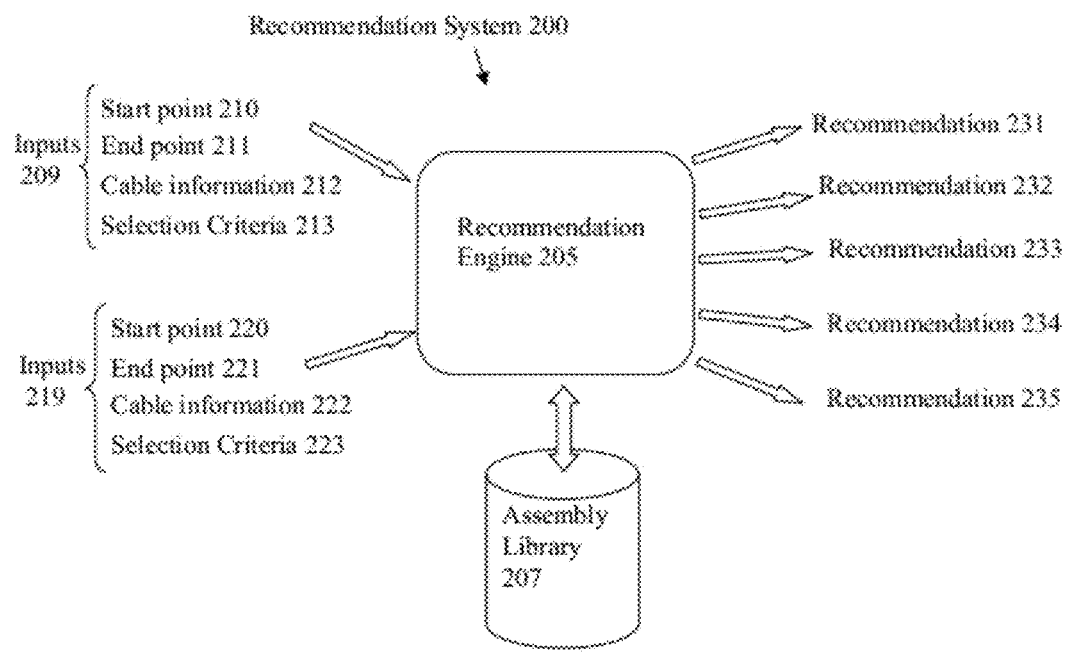
FIG. 2 is a schematic of another embodiment of a method of using a recommendation engine for designing a cabling layout.

FIG. 2 shows recommendation system 200 comprising a recommendation engine 205 and an assembly library 207. Library 207 is similar to library 115, and is used to store a plurality of assembly objects that represent parameters relevant to designing a cabling layout in a modeled environment. Library 207 could also include environmental properties that describe attributes of the modeled environment. Alternatively, system 200 could include a separate design tool or library for creating and/or storing environment properties that represent a modeled physical environment. Recommendation engine 205 comprises a processor and executable code, which are communicatively coupled with library 207. In embodiments where the modeled physical environment is stored in a design tool database, engine 205 is configured to communicatively couple with the design tool and design tool database. Those of skill in the art will appreciate that engine 205 could also be integrated with a design tool (e.g., engine 205 could be a module of a larger compilation of executable code), and could even be integrated with library 207 and/or a design tool library. Numerous hardware implementations can be used consistently with the inventive concepts disclosed herein and the inventive subject matter is not intended to be limited by any particular configuration.

System 200 is useful for providing recommendations to a design engineer regarding designing a cabling layout within a modeled physical environment. A design engineer provides inputs 209 and 219 to recommendation engine 205 using any suitable input means (e.g., keyboard commands, mouse commands, voice commands, etc). Engine 205 constructs a query for querying assembly library 207 based on inputs 209 and/or inputs 219 and provides query results in the form of recommendations 231-235.

Inputs 209 include a start point 210, end point 211, cable information 212, and selection criteria 213. Start and end points 210 and 211 identify the location within a modeled physical environment where a cabling route is to start and stop (e.g., locations of electrical panels). Inputs 209 could also include middle points that identify locations where a cabling route must pass through or avoid. Cable information 212 includes cable properties and attributes, such as: number of cables that need to be routed, cable names, cable sizes, cable types (e.g., power cable, Ethernet), voltage and current capacity of cables, cable lengths, and other cable properties relevant to designing cabling layouts. Selection criteria 213 is similar to selection criteria 130, as already discussed.

Recommendations 231-235 are search results provided by recommendation engine 205. Recommendations 231-235 assist a design engineer in designing a cabling layout within a modeled physical environment. For example, recommendations 231-235 could include recommendations on: cable routes, the number of cable tray lanes per route, cable types, cable tray sizes/types, tray anchor types, assignment of cables to lanes; and cable In one embodiment, the design engineer provides inputs for power requirements (e.g., eight 120-volt outlets) and communication requirements (20 high-speed data port), and recommendation engine 205 provides recommendations on cable sizes, cable types, cable routes, and cable trays that satisfy the power and communication requirements. In this manner, engine 205 functions to fill in information gaps with respect to cable information 212, when a design engineer only provides minimal cable information 212 data. In other words, engine 205 advantageously determines possible cable sizes and cable types that can be used for a cabling layout design. Recommendations 231-235 preferably include more than one set of recommendations that satisfy the requirements. In addition, engine 205 preferably presents the sets of recommendations in a ranked fashion (e.g., nearest match, most cost effective, most power efficient, etc.).

Engine 205 can include a printer, monitor, or other suitable output device for displaying and/or presenting recommendations to a design engineer. Engine 205 is preferably in communication with a design tool that can be used to create a modeled physical environment. Presenting a user with a recommendation can be performed by updating the modeled physical environment via the design tool to include a cabling layout. In some embodiments, engine 205 could be integrated with the design tool (e.g., engine 205 is one of many modules within the design tool).

Figure 3:
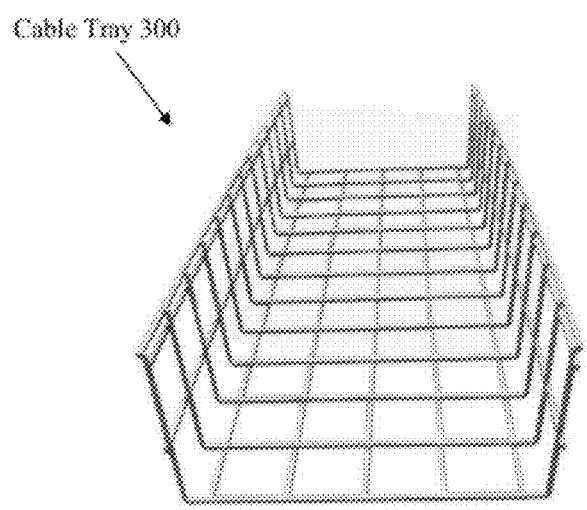
FIG. 3 is a perspective view of one embodiment of a cable tray.

FIG. 3 shows a cable tray 300. Tray 300 is configured to hold a plurality of cables. While the present application specifically mentions cable "tray," those of skill in the art will appreciate that any assembly suitable for housing cables can be used with the inventive subject matter disclosed herein (e.g., pipes). The present inventive subject matter is not intended to be limited by a particular configuration for a cable housing. Examples of cable trays are discussed in US Patent Application Publication No. 20100181438 (Chauzu), which is incorporated herein by reference.

Library 115 and library 207 of systems 100 and 200, respectively, have assembly objects that describe various attributes and properties of tray 300 (e.g., dimensions, material, shape, cable capacity). Libraries 115 and 207 have assembly objects that store attributes for numerous types of cable trays, cable housings, and housing fasteners/anchors. A broad selection of cable trays allows systems 100 and 200 to provide recommendations for designing many different cabling layouts. In preferred embodiments, engine 205 is configured with executable code that is capable of creating new cable tray shapes, types, and sizes, based on known cable trays and selection criteria. In other words, engine 205 is capable of creating new assembly objects based on existing assembly objects and user-defined selection criteria. In this manner, engine 205 provides recommendations for cabling layouts that include customized trays for each particular layout.

Figure 4:
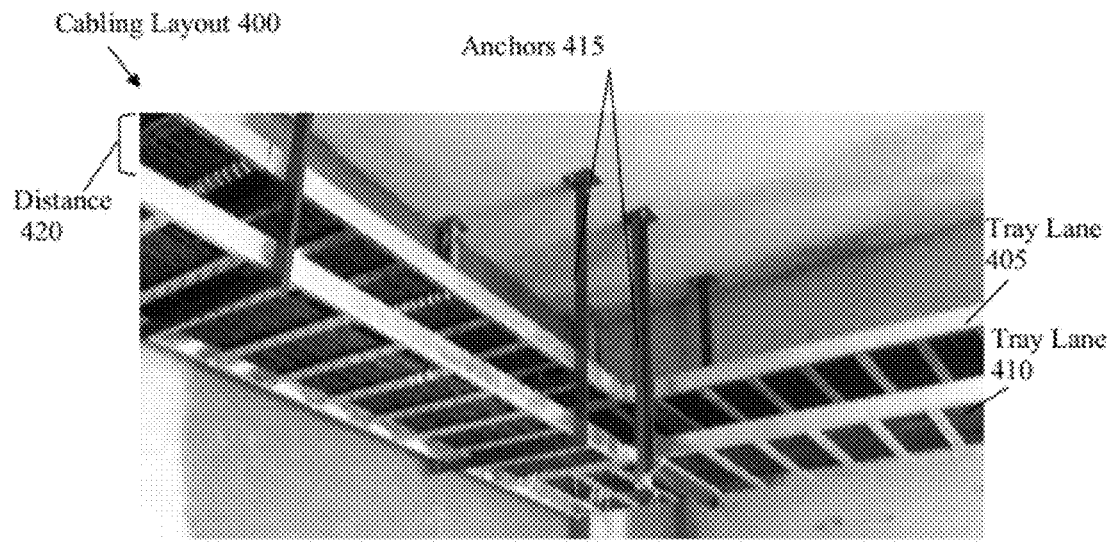
FIG. 4 is a perspective view of a portion of a cable route having vertical parallel lanes.

FIG. 4 shows a portion of a cable route within a modeled physical environment. The cable route includes a cable tray lane 405 and a cable tray lane 410 running parallel and vertical to one another. Lanes 405 and 410 are separated by a distance 420 and fastened to a ceiling via anchors 415. As used herein, a "lane" is a single cable tray pathway running between a start point and destination point. As used herein, a "cable route" refers to a pathway of cables between a start point and a destination point. A cable route can include one lane of cable trays or multiple lanes of cable trays. Multi-lane cable routes are beneficial since they provide separation between different cable bundles having different voltages and amperages. Distance 420 provides a safe barrier for isolating different cable types. Distance 420 can be defined by government regulation, industry standards, customer specifications, design engineer preferences, or any other source capable of determining an appropriate barrier between different cable bundles.

Engine 205 is configured to recommend number of lanes to use per route, and assign cables to each lane, based on selection criteria 213 and assembly rules stored in library 207. Engine 205 advantageously provides a complete solution for automating the design of cabling layouts by simultaneously determining cable routes, tray sizes, lanes per route, and cable-to-lane assignment.

Figure 5:
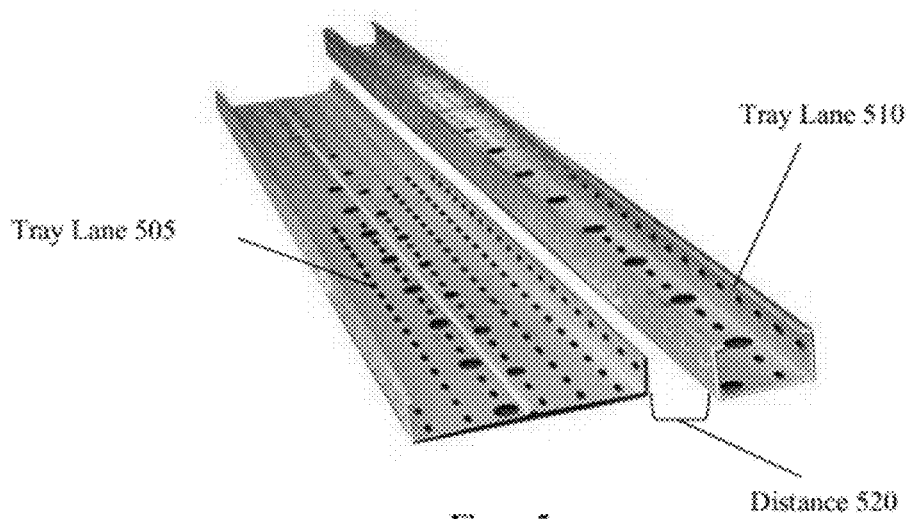
FIG. 5 is a perspective view of a portion of a cable route having horizontal parallel lanes.

FIG. 5 shows a portion of a cable route within a modeled physical environment. The cable route includes a tray lane 505 and a tray lane 510 that run parallel and horizontal to one another. Lanes 505 and 510 are separated by a horizontal distance 520. FIG. 5 shows how lanes can be horizontally positioned rather than vertically positioned. Those of skill in the art will appreciate any orientation of multiple lanes can be used consistently with the inventive concepts disclosed herein.

Figure 6:
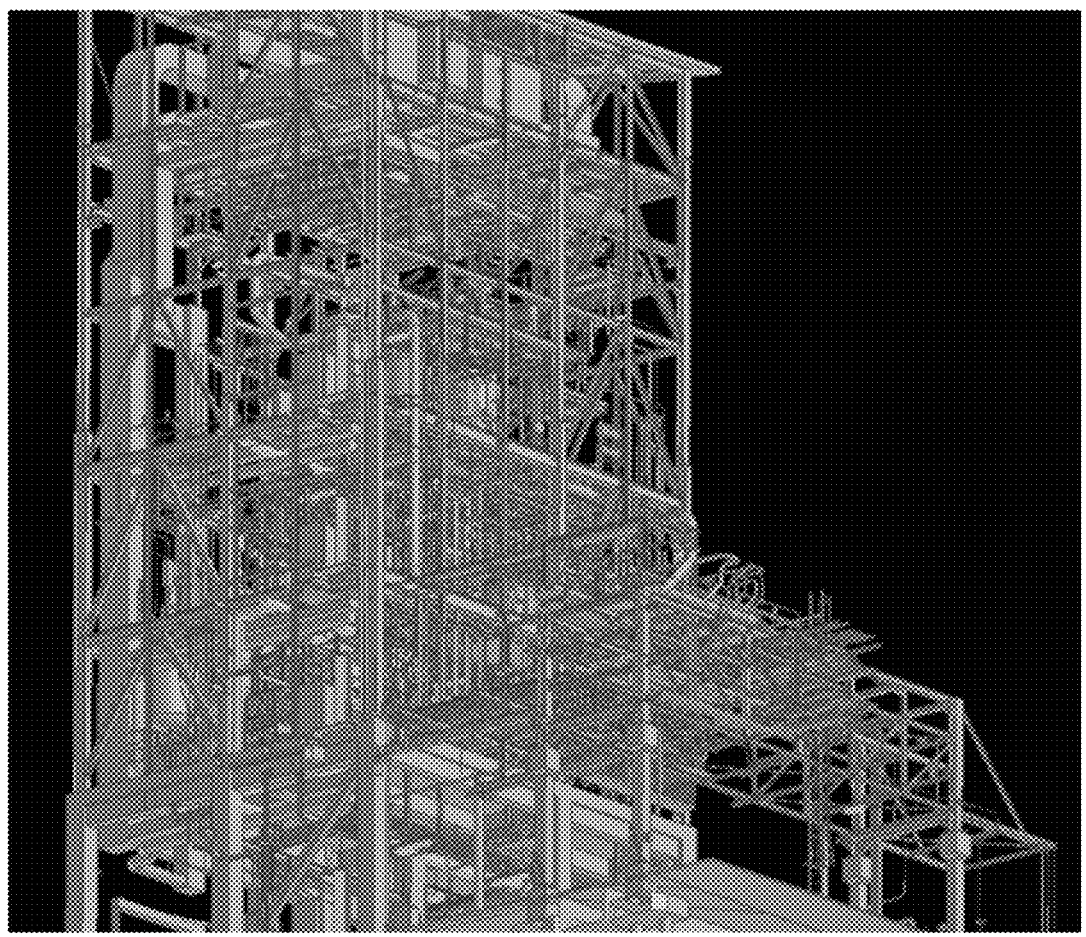
FIG. 6 is a drawing of a modeled physical environment comprising a building with a cabling layout.
Figure 7A:
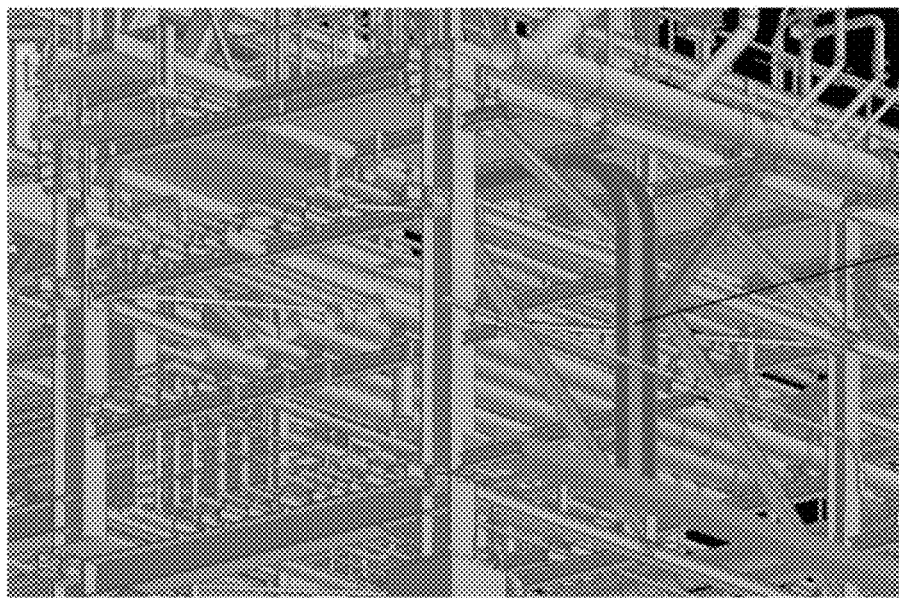
FIG. 7a-d are a close-up views of the drawing of FIG. 6, showing tray lanes of a cable route.
Figure 7B:
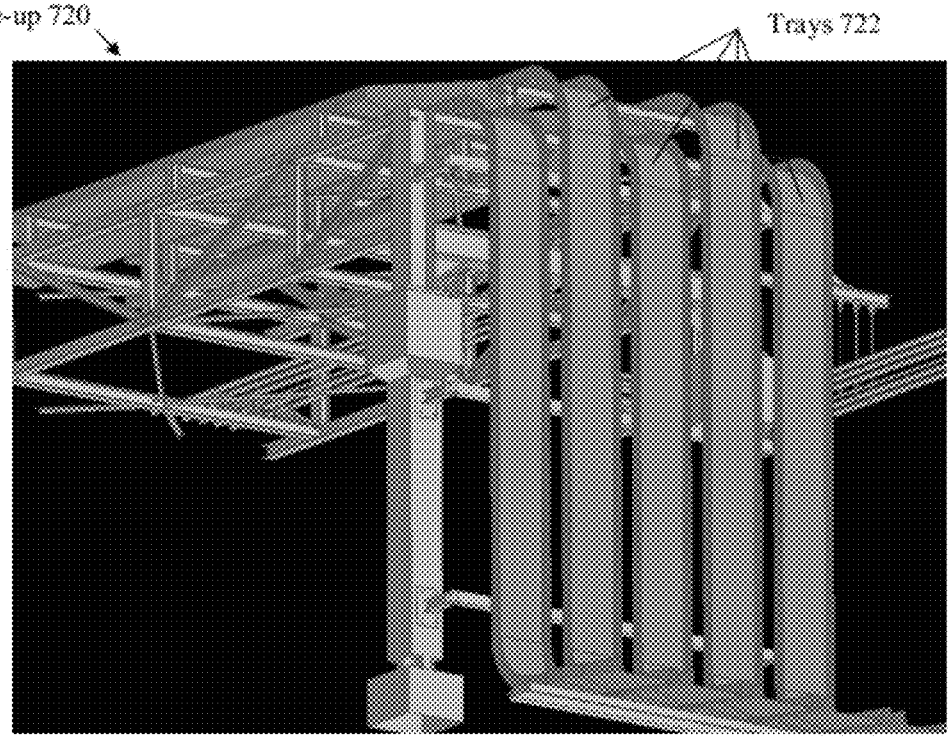
Figure 7C:
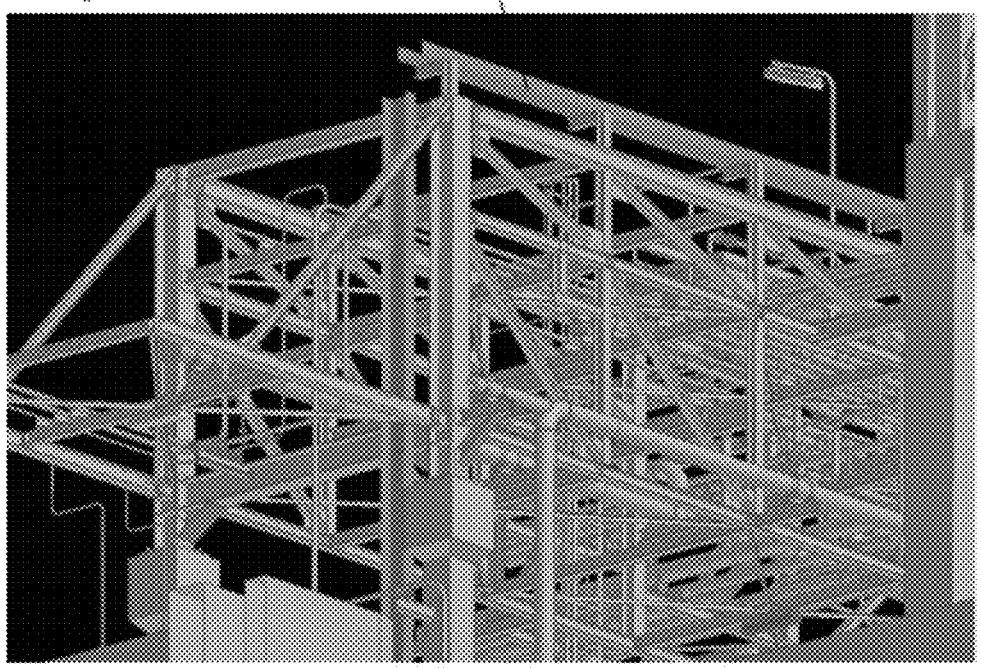
Figure 7D:
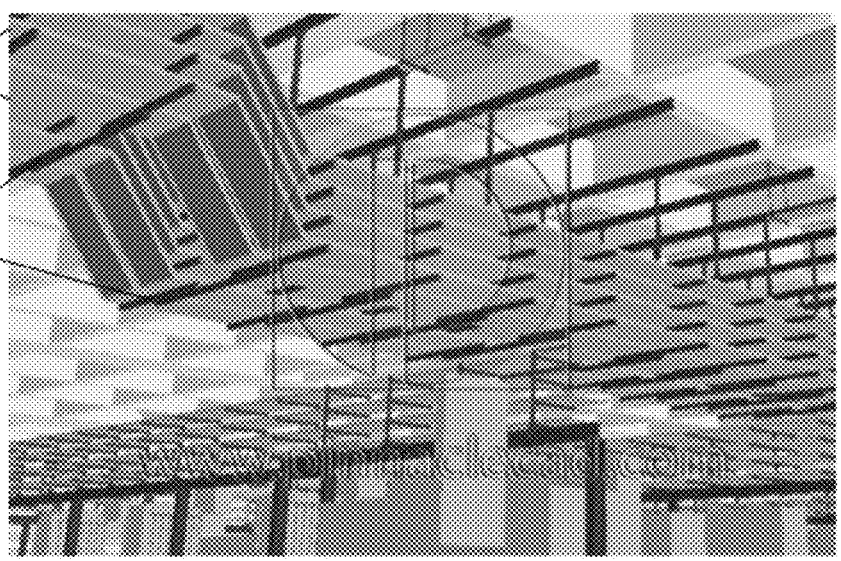

FIG. 6 shows a modeled physical environment 600, which describes a multi-leveled building having many different structural components. Environment 600 has been created using a design tool, such as tools 105 and 106. Within the building of environment 600 are various cabling layouts. FIGS. 7a-d show close-up views 710, 720, 730 and 730, respectively, of environment 600. View 710 shows a tray 712. View 720 shows a cable tray route that has multiple tray lanes 722. View 730 shows a tray 732. View 740 shows tray lanes 742 attached to a ceiling structure via anchors 744. The cabling layouts within environment 600 provide a design engineer with the ability to visualize and plan cabling routes during a construction project.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include commercially practical values. Similarly, all lists of values should be considered as inclusive of intermediate values unless the context indicates the contrary.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc

What is claimed is:

1. A method of designing a cabling layout within a physical environment of a construction project, the method comprising:
   providing an assembly library storing a plurality of assembly objects, wherein the assembly objects comprise cable attributes, tray attributes, modeled physical environment properties that reflect the physical environment during a design phase of the construction project, and assembly rules;
   defining a cabling layout using at least some of the assembly objects and based on the modeled physical environment properties;
   continuously observing, by a monitoring agent, the physical environment during a construction phase of the construction project to detect a change to the physical environment;
   identifying, by a recommendation engine, a conflict between the change to the physical environment and the cabling layout;
   updating automatically, by the recommendation engine, the cabling layout to resolve the detected conflict using at least one assembly rule.

2. The method of claim 1, wherein the assembly library comprises an electronic storage medium.

3. The method of claim 1, wherein the cable attributes comprise name, type, size, voltage capacity, and amperage capacity.

4. The method of claim 1, wherein the tray attributes comprise type, shape, size, dimension, and fastener type.

5. The method of claim 1, wherein the modeled physical environment properties comprise size and location of structural components of a building.

6. The method of claim 1, wherein the assembly rules comprise customer specifications, government safety requirements, industry standards, and cable manufacturer specifications.

7. The method of claim 1, wherein the assembly rules comprise one or more cabling routing algorithms.

8. The method of claim 1, wherein the step of defining the cabling layout comprises defining a source point, a destination point, an avoidance point, a pass-through point, a redundancy setting, a tray fill capacity limit, a number of lanes per route, and space requirement between lanes.

9. The method of claim 1, wherein the step of updating automatically the cabling layout comprises automatically establishing cable routes, designing cable trays, and modeling cable trays along the routes based on the changed physical environment.

10. The method of claim 9, wherein the steps of establishing cable routes and designing cable trays are performed in parallel as a function of one another.

11. The method of claim 1, wherein the step of updating the cabling layout comprises including one or more new assembly objects that satisfy the at least one assembly rule.

12. The method of claim 11, wherein the created assembly objects comprise a tray size and dimension.

13. The method of claim 1, further comprising the step of generating the modeled physical environment properties based on a set of actual environment properties during the design phase of the construction project.

14. The method of claim 13, wherein the modeled physical environment properties are generated by the data received from the monitoring agent.

15. The method of claim 1, further comprising the step of ranking the one or more assembly objects according to the at least one assembly rule.

16. The method of claim 1, further comprising identifying a conflict between the cabling layout and at least one assembly object.

17. The method of claim 1, further comprising identifying a conflict between the cabling layout and the at least one of assembly rule.

18. The method of claim 17, further comprising automatically providing a recommendation to resolve the conflict.

19. The method of claim 17, wherein the updated cabling layout resolves the conflict.

20. The method of claim 1, wherein the physical environment are external to the cabling layout.

21. The method of claim 1, further comprising iteratively performing the steps of (i) observing the physical environment to detect a change to the physical environment during the construction phase, (ii) identifying a conflict, and (iii) updating automatically the cabling layout.

22. The method of claim 1, wherein automatically updating the cabling layout comprises iteratively conducting the steps of identifying assembly objects for inclusion in the cabling layout and updating the cabling layout with the identified assembly objects until the cabling layout does not conflict with the detected change to the physical environment.

23. The method of claim 1, further comprising the step of storing a history of changes to the modeled physical environment properties and the cabling layout.

24. The method of claim 23, further comprising the steps of deriving a grade for a change to the cabling layout and storing the grade in the assembly library.

25. The method of claim 1, further comprising the steps of recommending (i) a number of lanes per route and (ii) a cable-to-lane assignment.

26. A cabling layout recommendation engine comprising:
   an assembly library storing a plurality of assembly objects, wherein the assembly objects comprise cable attributes, tray attributes, modeled physical environment properties that reflect a physical environment of a construction project, and assembly rules;
   at least one processor communicatively coupled with the assembly library; and
   executable code communicatively coupled with the at least one processor and configured to:
      defining a cabling layout using at least some of the assembly objects and based on the modeled physical environment properties,
      continuously observe the physical environment during a construction phase of the construction project to detect a change to the physical environment,
      identifying a conflict between the change to the physical environment and the cabling layout;
      provide a cabling layout recommendation as a function of the changed physical environment, at least one cable attribute, and at least one assembly rule.

27. The engine of claim 26, wherein the recommendation comprises a cable route connecting a source location and a destination location, a number of lanes per route, and a cable-to-tray assignment.

28. The engine of claim 26, wherein the recommendation comprises a tray size and a cable route.

29. The engine of claim 28, wherein the executable code is configured to recommend the tray size and cable route as a function of each other.

\* \* \* \* \*